(12) United States Patent
Gailloux et al.

(10) Patent No.: US 7,496,349 B1
(45) Date of Patent: Feb. 24, 2009

(54) DEVICE DRIVEN SYSTEM FOR ACTIVATING A WIRELESS DEVICE

(75) Inventors: Michael A. Gailloux, Overland Park, KS (US); Robin D. Katzer, Olathe, KS (US); Sanjay Kumar Sharma, Olathe, KS (US); Robert E. Urbanek, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 411 days.

(21) Appl. No.: 11/316,288

(22) Filed: Dec. 22, 2005

(51) Int. Cl.
*H04M 1/68* (2006.01)
(52) U.S. Cl. .................................. 455/410; 455/435.1
(58) Field of Classification Search .................. 455/410, 455/411, 435.1; 370/439; 235/380, 492
See application file for complete search history.

(56) References Cited

U.S. PATENT DOCUMENTS

2006/0213972 A1* 9/2006 Kelley et al. ................ 235/380

OTHER PUBLICATIONS

Olding, Douglas, et al., "Method and System for Use of Common Provisioning Data to Activate Cellular Wireless Devices," filed Sep. 12, 2003, U.S. Appl. No. 10/660,957, Specification (31 pgs.) and Drawings (4 sheets).

* cited by examiner

*Primary Examiner*—Sam Bhattacharya

(57) ABSTRACT

A system for activating a wireless device comprising a wireless device having an input operable for a user of the wireless device to initiate activation of the wireless device. The system includes a telecommunication network operable to communicate with the wireless device. The system includes an authentication component of the telecommunication network operable to identify the wireless device as not authenticated on the telecommunication networks the telecommunication network allowing access by the wireless device for activation. The system includes an activation system operable based on the activation information received to perform input to activate the wireless device such that the only telecommunication network user input required for activation of the wireless device will be the user of the wireless device.

20 Claims, 4 Drawing Sheets

DEVICE DRIVEN SYSTEM FOR ACTIVATING A WIRELESS DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to the activation of wireless devices and more particularly, but not by way of limitation to, the architecture and applications to support a device driven system for activating a wireless device.

BACKGROUND OF THE INVENTION

Wireless communication is well known. Sometimes wireless devices need to be activated when sold. There are many techniques used to activate a wireless device. A wireless device may be, but is not limited to, a digital, cellular, and other wireless phones, PDAs, and so on. Activation may include allowing the wireless device to be available for on going use in a telecommunications network. The activation process may include a number of steps such as, but not limited to, enabling the underlying wireless telecommunications network to be able to communicate with the wireless device.

SUMMARY OF THE INVENTION

One embodiment of the disclosure is a system for activating a wireless device comprising of a wireless device having an input operable for a user of the wireless device to initiate activation of the wireless device. The system includes a telecommunication network operable to communicate with the wireless device. The system includes an authentication component of the telecommunication network operable to identify the wireless device as not authenticated on the telecommunication network, the telecommunication network allowing access by the wireless device for activation. The system includes an activation system operable based on the activation information received to perform input to activate the wireless device such that the only telecommunication network user input required for activation of the wireless device will be the user of the wireless device.

An alternative embodiment provided is a method for activating a wireless device. The method includes initiating activation of a wireless device by a user using the wireless device where the input activation information is performed via the wireless device where the wireless device is communicating with at least one portion of a telecommunication network. The method includes determining that the wireless device is not authenticated on the telecommunication network, where the telecommunication network is responsible for allowing access by the wireless device activation. The method includes determining by an authorization component of the telecommunication network whether to allow the wireless device to perform activation. The method uses input information to activate the wireless device based on the activation information such that the only telecommunication network input required for activation of the wireless device being the user of the wireless device.

Another embodiment provides a telecommunications network architecture for self activation of a wireless device. This embodiment includes a wireless device having an input operable for a user of the wireless device to initiate activation of the wireless device. Since the wireless device may be purchased before it has been activated on the telecommunications network, the wireless device will need to be activated. This architecture includes an authentication component of the telecommunication network operable to identify the wireless device as not authenticated on the telecommunication network, where the telecommunication network allows access by the wireless device for activation. The system includes an authorization component of the telecommunication network operable to allow the wireless device to perform activation. The architecture includes an activation system operable based on activation information to perform input to activate the wireless device such that the only telecommunication network input required for activation of the wireless device is given by the user of the wireless device without the assistance of a third party. In some embodiments, a client application on the device may be operable for communicating with back-office enterprise information technology systems to provide activation information. This information may be sufficient or used in combination with other information provided by or obtained or accessible by the back-office enterprise information technology systems to promote activation of the device. Activation according to this alternate embodiment may occur with minimal or perhaps without any information being directly input by the user. An interactive voice response system (IVR) is operable to promote activation by voice response communication with the user of the wireless device to promote activation by data communication with the wireless device. A gateway component is operable to determine when the wireless device is not activated and promotes communication of the voice signals of the wireless device to the interactive voice response system and promote communication of data signals of the wireless device to the data system.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

It should be understood at the outset that although an exemplary implementation of one embodiment is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Activating a wireless device is tedious and time consuming and requires considerable effort by the telecommunication provider systems and personnel. Activation information is processed by personnel associated with the telecommunications provider's personnel, such as at retail stores or via call centers that process the information from the user to authorize and activate the wireless device. To reduce human resources needed, the present disclosure provides for automatic activation by the user using the wireless device for input, without the assistance of any individuals employed by or associated with the telecommunications provider. When a wireless device needs to be activated where authorization is necessary, various information must be processed before authorization is achieved, including credit report information, credit card information, fraud checking and personal information must be obtained. Information about the wireless device itself also needs to be determined, including the services and features that are available for and will be activated on the wireless device. This may include obtaining the hardware version and software release the wireless device is using. The present disclosure provides a system operable for an individual to activate a wireless device without any assistance from the personnel associated with the telecommunications provider.

Figure 1:
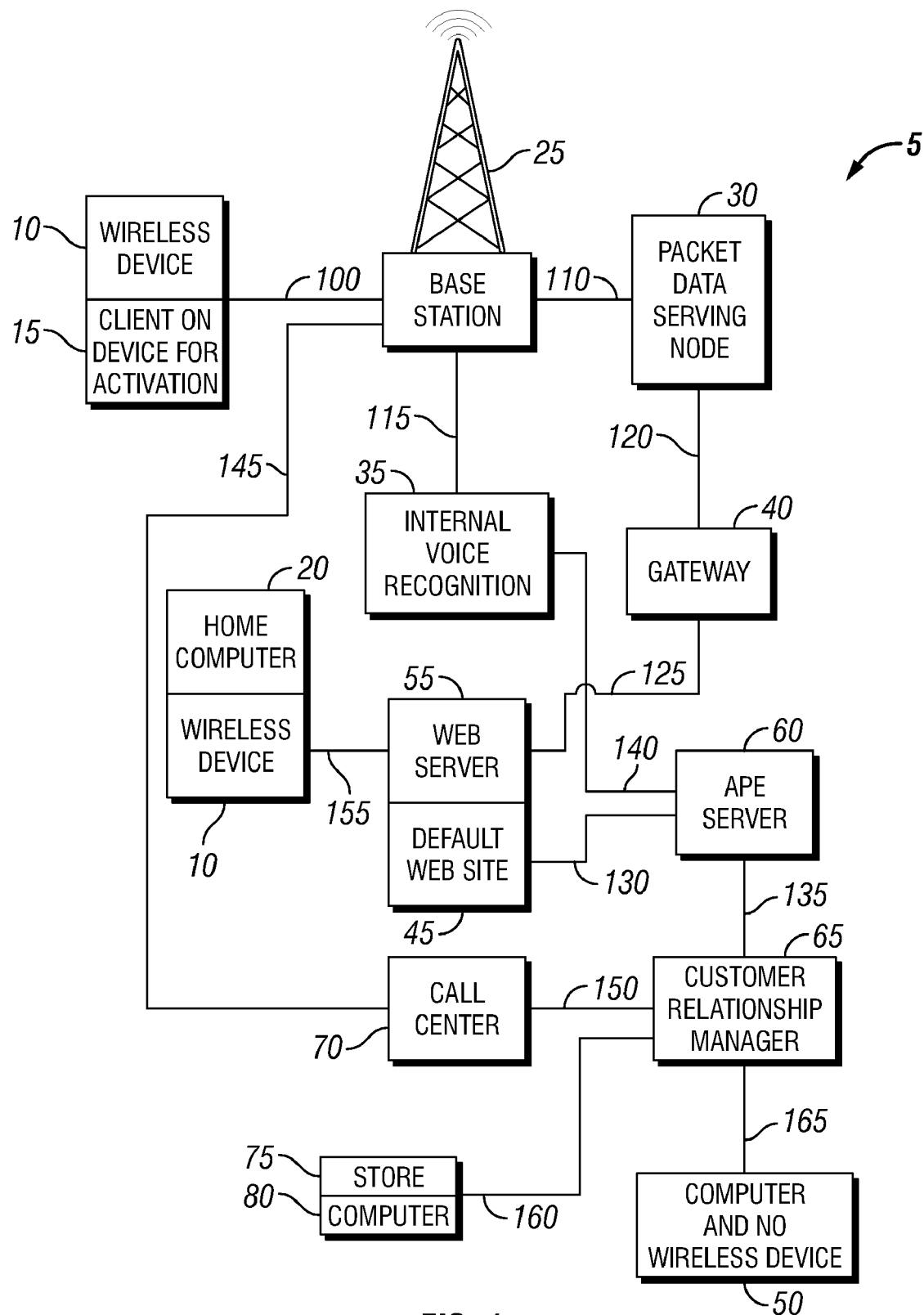
FIG. 1 is a block diagram of one embodiment of the present disclosure.

Turning now to FIG. 1, a block diagram of a system 5 for activating a wireless device 10 is depicted. FIG. 1 illustrates a base station 25 which is used as the first point of contact for the wireless device 10 to the telecommunications network. The wireless device 10 communicates wirelessly with the base station 25, which is a component of a wireless telecommunications system, via communication channel 100 using one of many possible wireless protocols well known to those skilled in the art. The base station 25 will determine whether the call made for activation of the wireless device 10 is data or voice and route the call accordingly. In one embodiment, if the activation information is data, the base station 25 will route that information via communication channel 110 to a packet data serving node 30. The packet data serving node 30 handles the routing of digital data. The packet data serving node 30 routes the data via communication channel 120 to a gateway 40 component.

The gateway 40 may be used to perform authentication of the wireless device 10. The gateway 40 may send information via communication channel 125 to a web server 55. The web server 55 is used to interface with any web site (e.g., default web site 45) or system needed to promote activation of the wireless device 10. The web server 55 may also be used to gather the information for activation. For example, a home computer 20 associated with a wireless device 10 may communicate with web server 55 via communication channel 155. Once the web server 55 gathers the information for activation, it is sent via communication channel 130 to an ape server 60. The ape server 60 may be used to provide the activation information sent from the wireless device 10, via communication channel 135, to a customer relationship system 65, which processes the information to activate the wireless device 10.

A customer relationship system 65 may be any system or systems used by corporations to maintain or manage customer records. In some of the embodiments, the customer relationship system 65 will have customer management software which can process customer information and other information needed for activation, such as credit scores, payment information and personal information about the customers. The customer management software on the customer relationship system 65 may also perform fraud checking to make sure the owner of the wireless device 10 is not previously registered and also to make sure the user is not trying to commit fraud on the telecommunications provider.

As mentioned above, the base station 25 routes activation information that is data traffic to the packet data serving node 30. In another embodiment, if the activation data is voice traffic, the base station 25 may route the communication to an interactive voice response 35 component via communication channel 115. The interactive voice response 35 component is a system well known to those skilled in the art, to take voice inputs from the wireless device 10 and process them without the help of any personnel of the telecommunications provider, such as call center 70 employees. The interactive voice response 35 component may communicate via communication channel 140 with an ape server 60 which will then route the activation information via communication channel 135 to the customer relationship system 65 for activation of the wireless device 10.

According to one embodiment, a client application 15 may be provided on the wireless device 10 to promote activation of the wireless device 10. The client application 15 sends information about the wireless device 10, such as the hardware version and software release, that can be used to determine the features that are available and can be purchased for the wireless device 10. In some embodiments, the client application 15 may have a user interface with features to simplify the user inputting information needed for activation. The features of the user interface may include predictive typing and other features to assist the user of the wireless device 10 in interfacing with the system 5 for activation.

A call center 70 receives activation information which is sent via communication channel 100 from the wireless device 10 to the base station 25. The base station then sends the activation information via communication channel 145 to the call center 70. In the event human interaction is necessitated, the activation information is received by employees at the call center 70 to activate the wireless device 10. The information is then sent via communication channel 150 to the customer relationship management system 65 component for activation processing. The customer relationship management system 65 may communicate via communication channel 160 with a computer 80 in a store 75, or via communication channel 165 with a computer with no wireless device 50.

Figure 2:
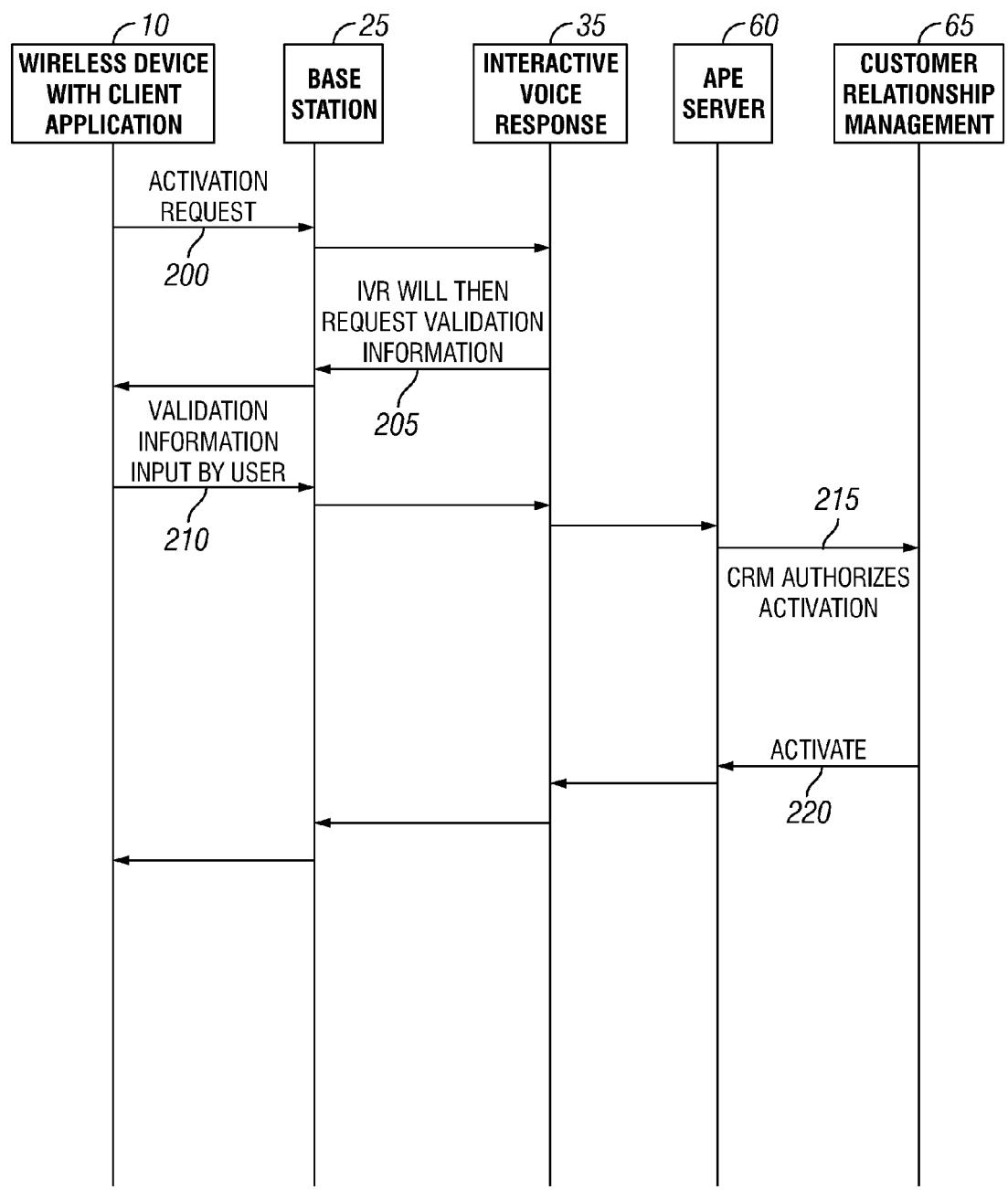
FIG. 2 is an event diagram of a device driven activation system according to one embodiment of the present disclosure, which in this case is the activation and authorization performed with the wireless device "in hand" using an Interactive Voice Response component (IVR).

Turning now to FIG. 2, an event diagram is depicted that describes a system for authorizing and activating a wireless device 10 via an interactive voice response 35 component. As discussed, the wireless device 10 may be provided with a client application 15 used to promote or initiate activation of the wireless device 10.

The client application 15 on the device 10 may be operable for communicating with back-office enterprise information technology systems (discussed below) to provide activation information. The user may provide this information via the client application 15, the client application 15 may be operable to obtain this information, such as the device phone number without user input. This information may be sufficient or used in combination with other information provided by or obtained or accessible by the back-office enterprise information technology systems to promote activation of the device 10. Activation according to this alternate embodiment may occur with minimal or perhaps without any information being directly input by the user, except perhaps by the user initiating the activation process.

The client application 15 may be operable to obtain information from or about the wireless device 10 including the Electronic Serial Number (ESN) Mobile Identification Number (MIN), the make and model of the phone or device, information about any hardware and software running on or used by the device 10, such as version, configuration, settings, parameters, preferences, and so on.

The wireless device 10 communicates with the telecommunications network to pass the activation request 200 to a base station 25. In one of the embodiments, the information is then passed to an interactive voice response system 35 which is used to request the validation information 205. The validation information 205 is then input by the user 210 of the wireless device 10 and sent to the interactive voice response system 35. The validation information 205 may include personal information. The client application 15 may also provide the hardware version and software release of the wireless device 10.

Once the activation information 205 is received by the interactive voice response system 35, it is communicated to the ape server 60 which will send the information to a customer relationship system 65. The customer management software of the customer relationship system 65 processes the information to authorize and activate 215 the wireless device 10. This may include any provisioning of services and credit checking. The customer relationship system 65 will then activate 220 the wireless device 10. The customer relationship systems 65 alone or in combination with other enterprise systems for managing the enterprise telecommunication capabilities, and enterprise and customer information may be referred to herein as back-office systems of the enterprise. These back-office systems, including the customer relationship management systems 65, may be operable alone or in combination with the client application 15 or other systems to initiate and active the device 10. These back-office systems may have access to information such as names, addresses, credit information, fraud checking, existing account information, and usage information about existing customers and accounts.

Figure 3:
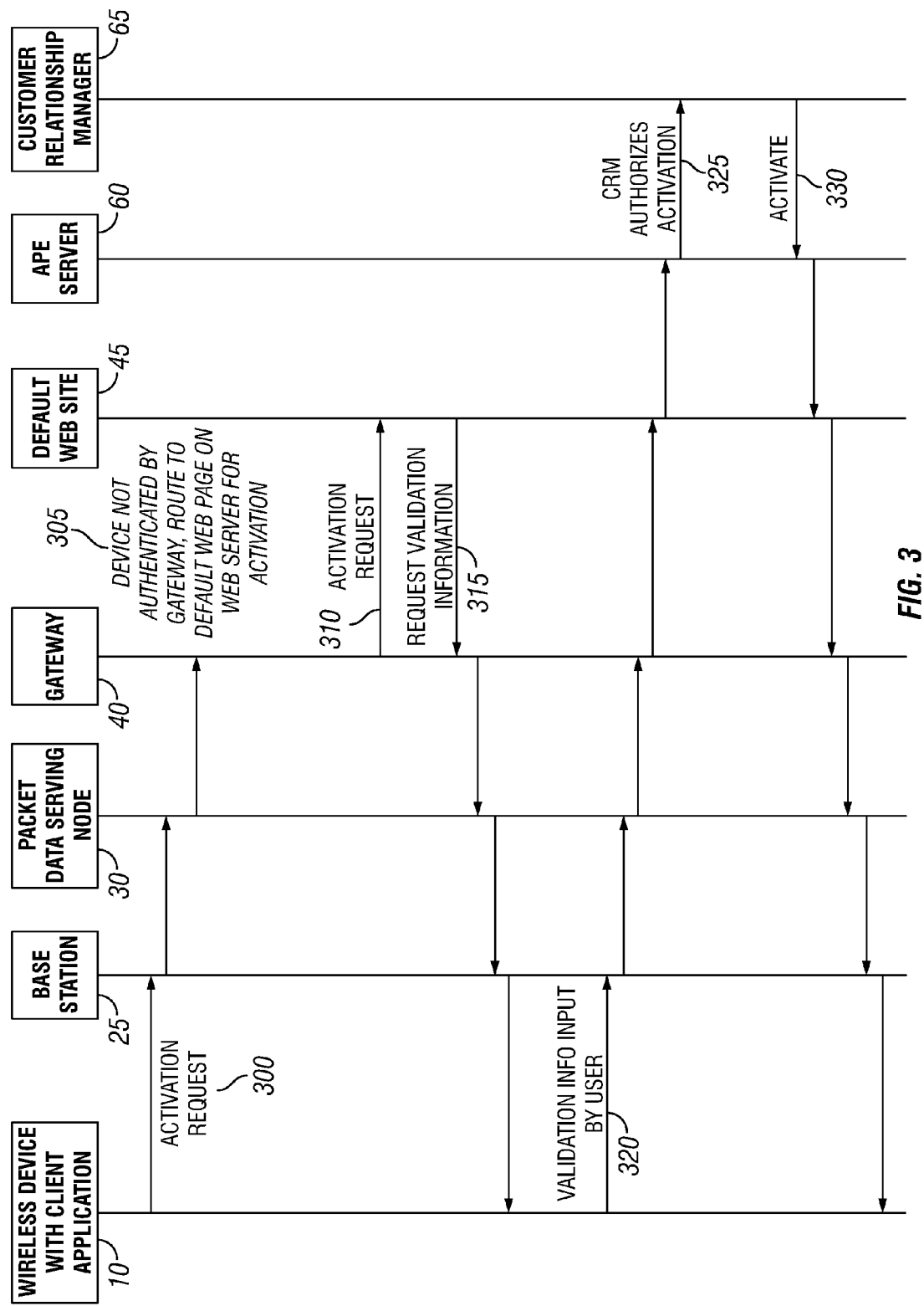
FIG. 3 is an event diagram of a device driven activation system according to another embodiment of the present disclosure, which in this case is the activation and authorization performed with the wireless device using a web server interface.

Turning now to FIG. 3, an event diagram is depicted that describes a system for authorizing and activating a wireless device 10 via a web server 55. The wireless device 10 again may have the client application 15 which may be used to initiate an activation request 300 for the wireless device 10. This information is communicated to the base station 25 of the telecommunications network. In one embodiment, the information is then passed to the packet data serving node 30 which checks to see if the data is sent from a valid and activated wireless device 10. If the wireless device 10 is not validated and needs activation 305, an activation request 310 can be directed to the default web site 45 on the web server 55 for this purpose. The web site 45 will be used to request the validation information 315 from the user of the wireless device 10, including personal information and/or the hardware version and software release of the wireless device 10. The user of the wireless device 10 provides the validation information 320 to the web site 45. The web site 45 then communicates with the ape server 60 which sends the information to the customer relationship system 65. The customer management software processes the information to authorize and activate 325 the wireless device 10. The customer relationship system 65 then activates 330 the wireless device 10.

In some embodiments, the activation process may only require the user entering the phone number via the client application 15 on the device 10. In some embodiments, the user may only initiate activation and the client application 15 may be operable to obtain the phone number with input by the user. The client application 15 then obtains any additional information needed for activation from the device 10. The client application 15 communicates with the back-office systems to activate the device 10. Some of the information needed for activation may be obtained or provided by the back-office systems. In other embodiments, more or fewer steps may be used. In other embodiments, the client application 15 or other back-office system may provide an activation file in a special directory on the device 10. A listening component may be responsive to the activation file being placed in the particular directory. The listening component may then initiate activation of the device 10.

It will be appreciated that the activation information, which may include the user or customer's information and information about the wireless device may be provided by the user, the client application 15 or by combinations of both. Also, this information may be provided by an iterative communication cycle where the client application 15 provides some information and the system 5 then prompts the user to provide additional information, and so on until all the information necessary for activation is obtained.

Figure 4:
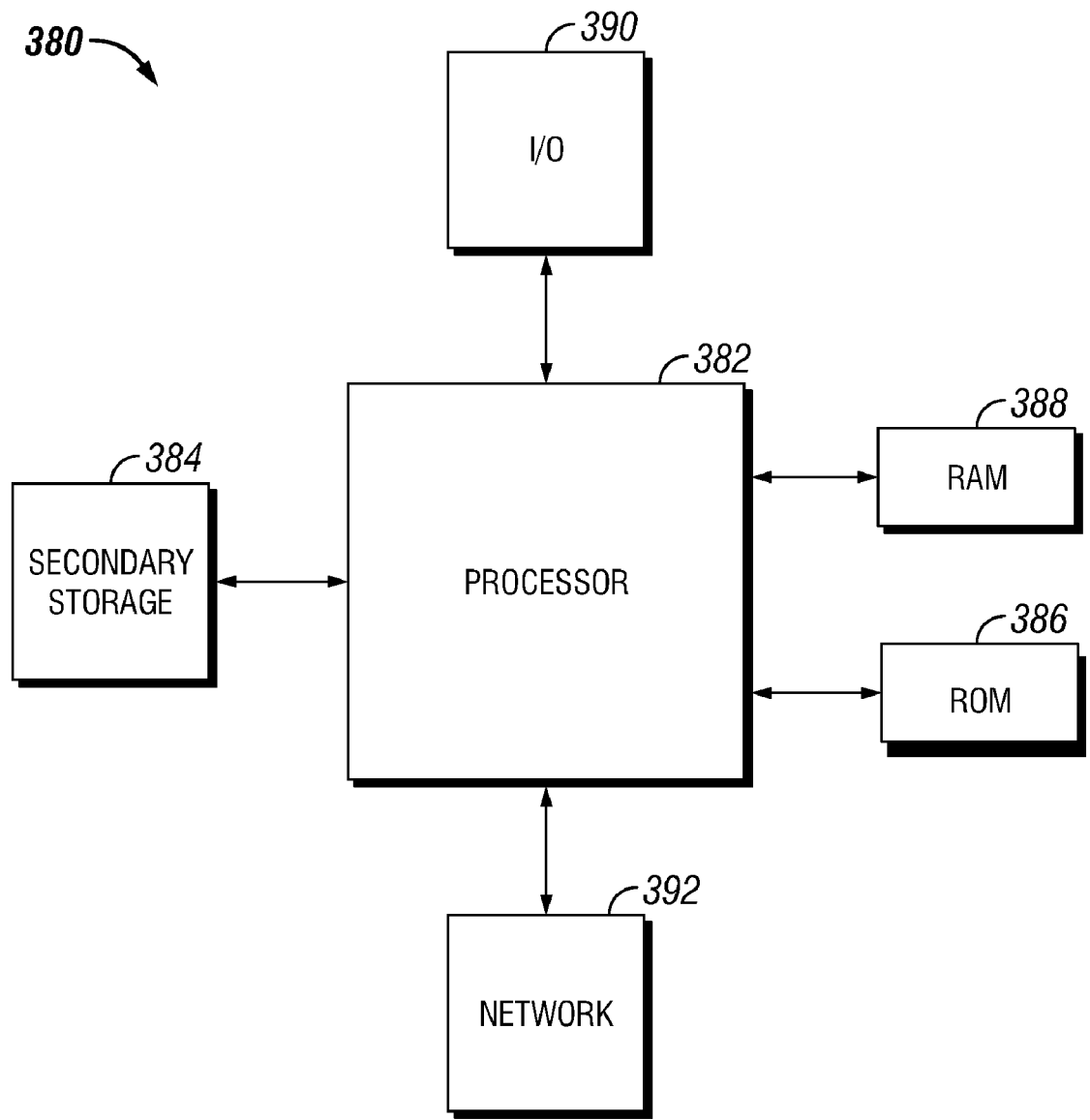
FIG. 4 illustrates a general purpose computer operable for implementing some of the systems disclosed herein.

Portions of the system or systems, such as the back-office systems, described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system for activating a wireless device, comprising:
    a wireless device having an input operable for a user of the wireless device to initiate activation of the wireless device;
    a telecommunication network operable to communicate with the wireless device;
    an authentication component of the telecommunication network operable to identify the wireless device as not authenticated on the telecommunication network, the telecommunication network allowing access by the wireless for activation;
    an authorization component of the telecommunication network operable to allow the wireless device to perform activation; and
    an activation system operable based on activation information to perform inputs to activate the wireless device such that the only telecommunication network user input required for activation of the wireless device being the user of the wireless device, and operable to activate the wireless device subsequent to an authentication or authorization of the wireless device.

2. The system of claim 1, further comprising a client application on the wireless device operable to promote activation of the wireless device.

3. The system of claim 1, wherein the client application provides information regarding the wireless device.

4. The system of claim 3, wherein the client application provides hardware and software version information about the wireless device.

5. The system of claim 1, wherein activation information comprises customer information.

6. The system of claim 1, wherein activation information comprises customer credit information.

7. The system of claim 1, wherein activation information comprises wireless services information.

8. The system of claim 1, wherein activation information comprises information about the wireless device.

9. A method of activating a wireless device, comprising:
    initiating activation of a wireless device by a user using the wireless device inputting activation information via the wireless device;
    the wireless device communicating with at least a portion of a telecommunication network;
    determining that the wireless device is not authenticated on the telecommunication network, the telecommunication network allowing access by the wireless for activation;
    determining by an authorization component of the telecommunication network to allow the wireless device to perform activation;
    performing inputs to activate the wireless device based on activation information such that the only telecommunication network user input required for activation of the wireless device being the user of the wireless device; and
    activating the wireless device subsequent to an authentication or authorization of the wireless device.

10. The method of 9, further comprising determining, by the telecommunication network, that the wireless device is not activated and authentication and authorizing the wireless device because the wireless device has not been activated.

11. The method of 9, wherein a client application on the wireless device obtains at least some information about the wireless device used for activation.

12. The method of 9, wherein the communication between the wireless device and the network is further defined as data communication.

13. The method of 9, wherein the activation system is operable to automatically provision the wireless device based on the activation information provided by the user, information obtained from the wireless device, and information obtained by a back-office system associated with the telecommunication network.

14. A telecommunication network architecture for self-activation of a wireless device, comprising:
- a wireless device having an input operable for a user of the wireless device to initiate activation of the wireless device;
- an authentication component of the telecommunication network operable to identify the wireless device as not authenticated on the telecommunication network, the telecommunication network allowing access by the wireless for activation;
- an authorization component of the telecommunication network operable to allow the wireless device to perform activation;
- an activation system operable based on activation information to perform inputs to activate the wireless device such that the only telecommunication network user input required for activation of the wireless device being the user of the wireless device;
- an application server maintaining applications enabling activation of the wireless device; and
- a component operable to determine when the wireless device is not activated and allow use of the wireless device for activation, wherein the activation system is further operable to activate the wireless device subsequent to an authentication or authorization of the wireless device.

15. The telecommunication network architecture of claim 14, further comprising an application server operable to promote activation of the wireless device by providing customer information to a customer system operable to maintain customer information, to provide billing information to a billing system, and to provide credit information to a credit system.

16. The telecommunication network architecture of claim 15, wherein the activation system further includes a fraud checking component.

17. The telecommunication network architecture of claim 15, wherein the credit system is further operable to automatically obtain credit information related to the user of the wireless device and automatically determine activation factors including wireless charges based on the credit information.

18. The telecommunication network architecture of claim 15, further comprising a client application provided on the wireless device and operable to obtain information related to the wireless device for activation.

19. The telecommunication network architecture of claim 15, further comprising a client application provided on the wireless device and operable to obtain information related to the wireless device for activation including a unique wireless device identifier.

20. The telecommunication network architecture of claim 15, wherein a unique wireless device identifier is selected from a group consisting of a phone number, an Electronic Serial Number (ESN), and a Mobile Identification Number (MIN).

* * * * *